US012694508B2

(12) United States Patent (10) Patent No.: US 12,694,508 B2
Gudovskiy et al. (45) Date of Patent: Jul. 28, 2026

(54) ANOMALY DETECTION METHOD, ANOMALY DETECTION DEVICE, AND RECORDING MEDIUM

(71) Applicant: Panasonic Intellectual Property Corporation of America, Torrance, CA (US)

(72) Inventors: Denis Gudovskiy, San Ramon, CA (US); Shun Ishizaka, Tokyo (JP); Kazuki Kozuka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 258 days.

(21) Appl. No.: 18/511,337

(22) Filed: Nov. 16, 2023

(65) Prior Publication Data

US 2024/0095906 A1 Mar. 21, 2024

Related U.S. Application Data

(63) Continuation of application No. PCT/JP2022/021263, filed on May 24, 2022.

(60) Provisional application No. 63/194,372, filed on May 28, 2021.

(51) Int. Cl.
*G06T 7/00* (2017.01)
*G06N 3/0464* (2023.01)
*G06V 10/44* (2022.01)

(52) U.S. Cl.
CPC ........... *G06T 7/001* (2013.01); *G06N 3/0464* (2023.01); *G06V 10/454* (2022.01); *G06T 2207/20084* (2013.01)

(58) Field of Classification Search
CPC .. G06N 3/0455; G06N 3/0464; G06V 10/454; G06T 7/001; G06T 2207/20084
See application file for complete search history.

(56) References Cited

U.S. PATENT DOCUMENTS 11,282,185 B2 * 3/2022 Nogami ................. G06V 10/82
2023/0410484 A1 * 12/2023 Udayamurthy .......... G06N 3/09

FOREIGN PATENT DOCUMENTS

JP 2021-81953 5/2021

OTHER PUBLICATIONS

International Search Report (ISR) issued on Aug. 9, 2022 in International (PCT) Application No. PCT/JP2022/021263.

(Continued)

*Primary Examiner* — Daniel G Mariam
(74) *Attorney, Agent, or Firm* — Wenderoth, Lind & Ponack, L.L.P.

(57) ABSTRACT

An anomaly detection method by which a computer performs anomaly detection includes: obtaining first feature data outputted through N (N is an integer not less than 1) convolutional layers of a convolutional neural network configured as an encoder when an image is inputted to the convolutional neural network; obtaining second feature data outputted through M (M is an integer not less than 1, and M≠N) convolutional layers of the convolutional neural network and different in size from the first feature data; and performing anomaly detection on the image by using features indicated by the first feature data and the second feature data that are different in size.

5 Claims, 11 Drawing Sheets

(56) References Cited

OTHER PUBLICATIONS

Paul Bergmann, et al., "MVTec AD—A Comprehensive Real-World Dataset for Unsupervised Anomaly Detection", IEEE/CVF Conference on Computer Vision and Pattern Recognition (CVPR), 2019.

Jihun Yi, et al., "Patch SVDD: Patch-level SVDD for Anomaly Detection and Segmentation", Asian Conference on Computer Vision (ACCV), 2020.

Niv Cohen, et al., "Sub-Image Anomaly Detection with Deep Pyramid Correspondences", arXiv:2005.02357v3, [cs.CV], Feb. 2021.

Chun-Liang Li, et al., "CutPaste: Self-Supervised Learning for Anomaly Detection and Localization", IEEE Conference on Computer Vision and Pattern Recognition (CVPR), 2021.

Thomas Defard, et al., "PaDiM: a Patch Distribution Modeling Framework for Anomaly Detection and Localization", International Conference on Pattern Recognition (ICPR), Nov. 2020.

Weixin Luo, et al., "A Revisit of Sparse Coding Based Anomaly Detection in Stacked RNN Framework", IEEE/CVF International Conference on Computer Vision (ICCV), 2017.

Shashanka Venkataramanan, et al., "Attention Guided Anomaly Localization in Images", European Conference on Computer Vision (ECCV), 2020.

* cited by examiner

FIG. 2

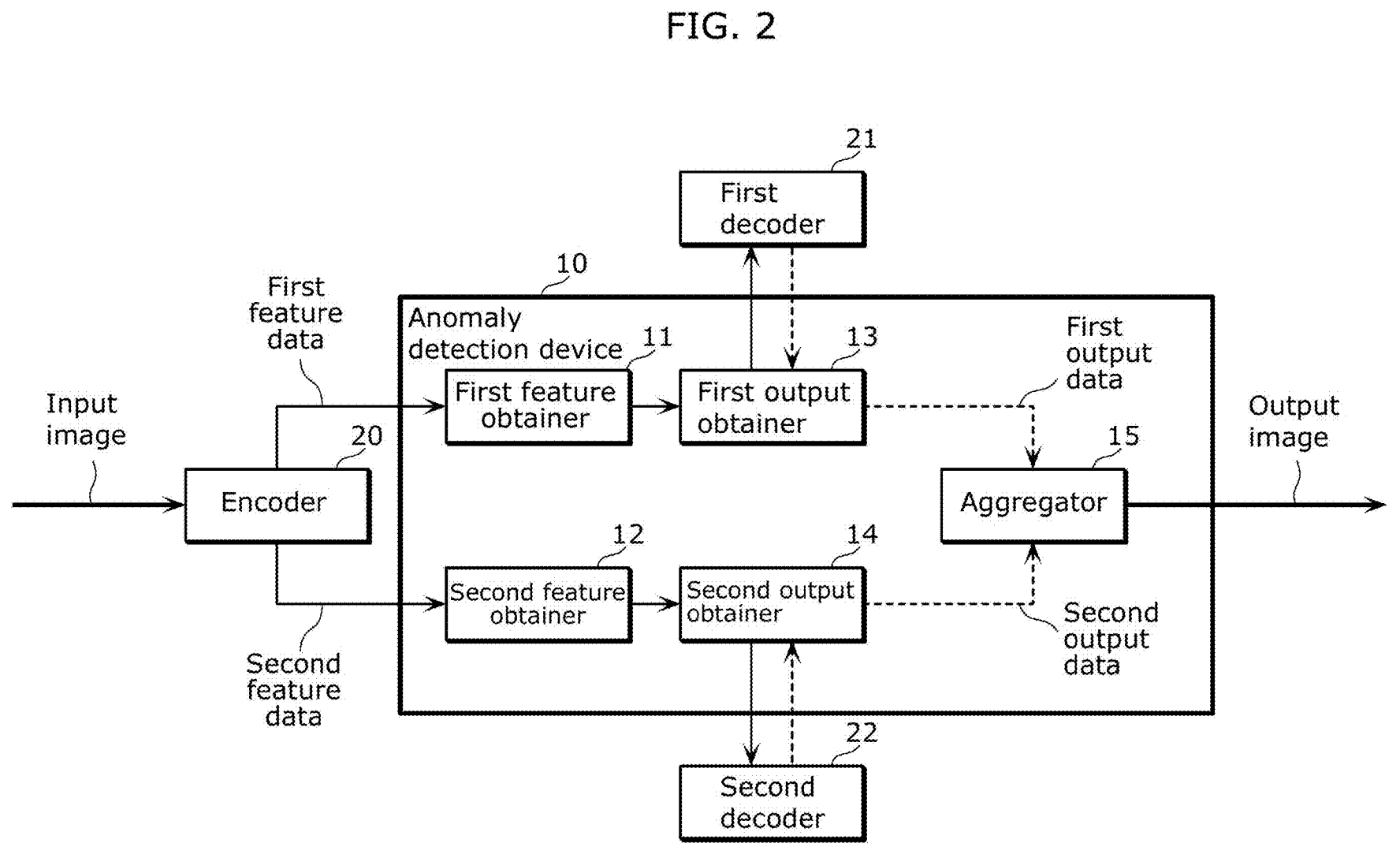

Input image

Encoder          20

First feature data

Second feature data

Anomaly detection device          10

First feature obtainer          11

Second feature obtainer          12

First decoder          21

Second decoder          22

First output obtainer          13

Second output obtainer          14

First output data

Second output data

Aggregator          15

Output image

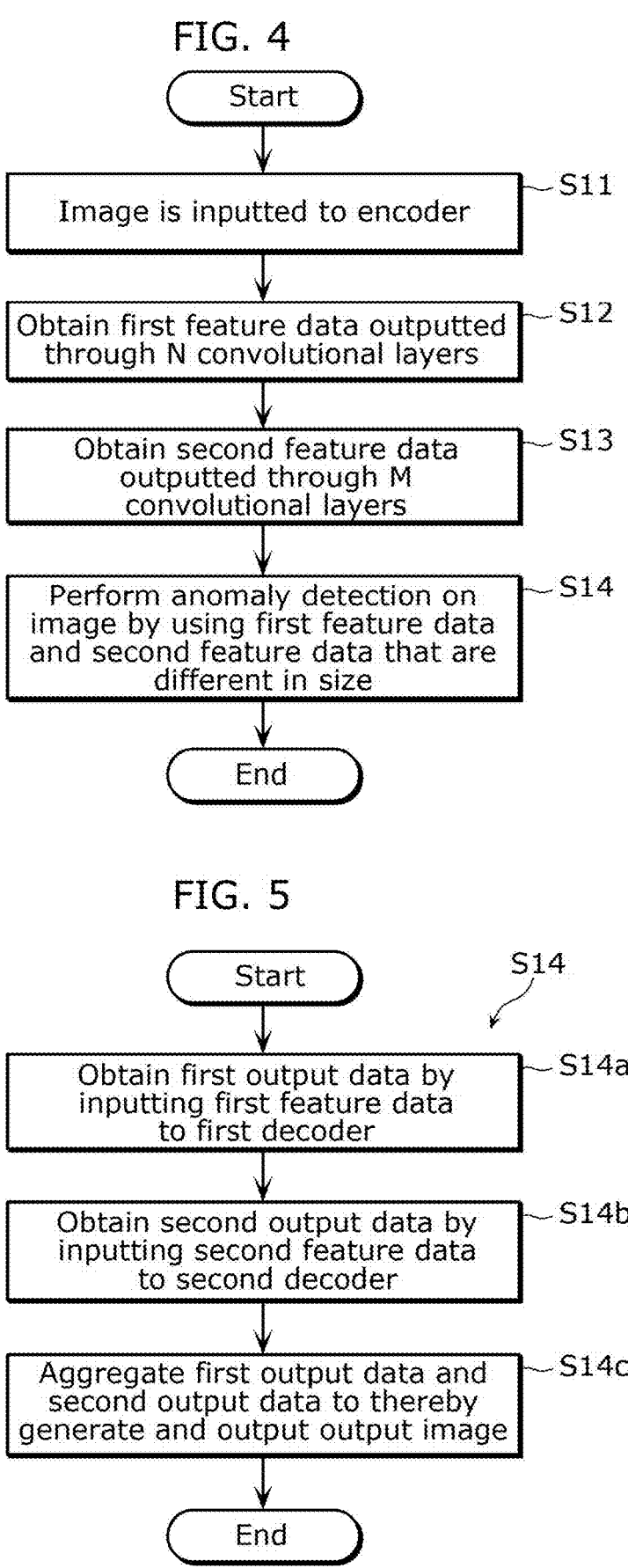

FIG. 4

Start

Image is inputted to encoder — S11

Obtain first feature data outputted through N convolutional layers — S12

Obtain second feature data outputted through M convolutional layers — S13

Perform anomaly detection on image by using first feature data and second feature data that are different in size — S14

End

FIG. 5

Start     S14

Obtain first output data by inputting first feature data to first decoder — S14a Obtain second output data by inputting second feature data to second decoder — S14b Aggregate first output data and second output data to thereby generate and output output image — S14c End

FIG. 9

| Metric | AUROC | | AUPRO |
|---|---|---|---|
| Model | Detection[%] | Localization[%] | |
| Comparative Example 1-1 | 92.1 | 95.7 | - |
| Comparative Example 1-2 | 85.5 | 96.0 | 91.7 |
| Comparative Example 1-3 | 97.1 | 96.0 | - |
| Comparative Example 1-4 | 97.9 | 97.5 | 92.1 |
| Anomaly detection device 10 | 98.26 | 98.62 | 94.60 |

FIG. 10

| Metric | AUROC | |
|---|---|---|
| Model | Detection[%] | Localization[%] |
| Comparative Example 2-1 | - | 85.0 |
| Comparative Example 2-2 | 71.9 | 89.9 |
| Comparative Example 2-3 | - | 91.2 |
| Anomaly detection device 10 | 72.63 | 94.48 |

FIG. 11

| Model | Inference speed [fps]<br>(256×256) / (512×512) | Model size [MB]<br>(STC) / (MVTec) |
|---|---|---|
| Comparative Example 3-1 | 4.4 / 4.4 | 210 / 170 |
| Anomaly detection device 10 | 34 / 12 | 96 / 96 |

FIG. 12

| Model | Inference speed [fps] (256×256) / (512×512) | Model size [MB] (STC) / (MVTec) |
|---|---|---|
| Comparative Example 4-1 | 0.1 / 0.1 | 37,000 / 1,400 |
| Comparative Example 4-2 | 1.1 / 1.1 | 5,200 / 3,800 |
| Anomaly detection device 10 | 27 / 9 | 947 / 947 |

ANOMALY DETECTION METHOD, ANOMALY DETECTION DEVICE, AND RECORDING MEDIUM

CROSS REFERENCE TO RELATED APPLICATIONS

This is a continuation application of PCT International Application No. PCT/JP2022/021263 filed on May 24, 2022, designating the United States of America, which is based on and claims priority of U.S. Provisional Patent Application No. 63/194,372 filed on May 28, 2021. The entire disclosures of the above-identified applications, including the specifications, drawings and claims are incorporated herein by reference in their entirety.

FIELD

The present disclosure relates to an anomaly detection method, an anomaly detection device, and a recording medium.

BACKGROUND

There is a method for detecting an anomaly in an image by using a convolutional neural network (CNN) to extract semantic information from the image and generate a downsampled feature map (see Non Patent Literature (NPL) 1).

CITATION LIST

Non Patent Literature

NPL1: Paul Bergmann, Michael Fauser, David Sattlegger, Carsten Steger, "MVTec AD—a comprehensive real-world dataset for unsupervised anomaly detection", In Proceedings of the IEEE/CVF Conference on Computer Vision and Pattern Recognition (CVPR), 2019

NPL2: Jihun Yi and Sungroh Yoon, "Patch SVDD: Patch-level SVDD for anomaly detection and segmentation", In Proceedings of the Asian Conference on Computer Vision (ACCV), 2020

NPL3: Niv Cohen and Yedid Hoshen, "Sub-image anomaly detection with deep pyramid correspondences", arXiv:2005.02357v3, NPL4: Chun-Liang Li, Kihyuk Sohn, Jinsung Yoon, Tomas Pfister, "CutPaste: Self-supervised learning for anomaly detection and localization", In Proceedings of the IEEE Conference on Computer Vision and Pattern Recognition (CVPR), 2021.2.6

NPL5: Thomas Defard, Aleksandr Setkov, Angelique Loesch, Romaric Audigier, "PaDiM: a patch distribution modeling framework for anomaly detection and localization", In Proceedings of the International Conference on Pattern Recognition (ICPR) Workshops, 2021

NPL6: Weixin Luo, Wen Liu, Shenghua Gao, "A revisit of sparse coding based anomaly detection in stacked RNN framework", In Proceedings of the IEEE/CVF International Conference on Computer Vision (ICCV), 2017.2

NPL7: Shashanka Venkataramanan, Kuan-Chuan Peng, Rajat Vikram Singh, Abhijit Mahalanobis, "Attention guided anomaly localization in images", In Proceedings of the European Conference on Computer Vision (ECCV), 2020. 7

SUMMARY

Technical Problem

When highly accurate anomaly detection is performed, a relatively long time is required for a process for anomaly detection.

Hence, the present disclosure provides an anomaly detection method that enables anomaly detection to be performed with high accuracy in a short period of time.

Solution to Problem

An anomaly detection method according to an aspect of the present disclosure is an anomaly detection method by which a computer performs anomaly detection, and the method includes: obtaining first feature data outputted through N (N is an integer not less than 1) convolutional layers of a convolutional neural network configured as an encoder when an image is inputted to the convolutional neural network; obtaining second feature data outputted through M (M is an integer not less than 1, and M≠N) convolutional layers of the convolutional neural network and different in size from the first feature data; and performing anomaly detection on the image by using features indicated by the first feature data and the second feature data that are different in size.

These general and specific aspects may be implemented using a system, method, integrated circuit, computer program, or computer-readable recording medium such as a CD-ROM, or any combination of systems, methods, integrated circuits, computer programs, or computer-readable recording media.

Advantageous Effects

With an anomaly detection method according to the present disclosure, it is possible to perform anomaly detection with high accuracy in a short period of time.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a block diagram schematically illustrating the functional configuration of an anomaly detection device according to an embodiment.

FIG. 4 is a first flowchart illustrating processes performed by the anomaly detection device according to the embodiment.

FIG. 5 is a second flowchart illustrating processes performed by the anomaly detection device according to the embodiment.

FIG. 9 is a first diagram for illustrating performance values of the anomaly detection device according to the embodiment.

FIG. 10 is a second diagram for illustrating performance values of the anomaly detection device according to the embodiment.

FIG. 11 is a third diagram for illustrating performance values of the anomaly detection device according to the embodiment.

FIG. 12 is a fourth diagram for illustrating performance values of the anomaly detection device according to the embodiment.

DESCRIPTION OF EMBODIMENT

Underlying Knowledge Forming Basis of the Present Disclosure

Regarding the technique of anomaly detection disclosed in the background section above, the inventors found the followings.

Anomaly detection (also referred to as AD) with anomaly position identification (i.e., localization) has many practical applications such as industrial inspection, road traffic monitoring, and medical diagnostics.

However, conventional supervised anomaly detection is difficult to be performed in a practical application. It is because, firstly, although labeled data is necessary, such labeled data is costly to obtain. Secondly, an anomaly is usually rare to occur and has relatively low probability to be acquired by a sensor. Thirdly, consistent labeling of anomalies requires extensive domain expertise.

With these limitations of supervised AD, more appealing approach is a method of collecting only unlabeled anomaly-free images for train dataset $D_{train}$ (see top row of FIG. 1 described later).

In the above-described method, any image deviated from an anomaly-free image is classified as an anomalous image. AD based on a dataset with relatively low rate of anomalies is generally considered to be unsupervised AD. Therefore, such an AD task can be reformulated as a task of out-of-distribution (OOD) detection with AD objective.

OOD for a low-dimensional industrial sensor (e.g., power-line sensor or acoustic sensor) can be accomplished by using a general k-nearest-neighbor or more advanced clustering method. However, OOD for a high-resolution image is not easy.

In recent years, a CNN is applicable as a method for extracting semantic information from an image to generate a downsampled feature map. Although feature extraction using a CNN has relatively low complexity compared to other methods, post-processing of a feature map in an unsupervised AD method is difficult to be performed in real-time.

To address such a complexity, the present inventors propose an AD method that is based on a conditional normalizing flow.

As with a CNN, the proposed AD method is agnostic to feature map spatial dimension, and therefore it is possible to achieve higher accuracy metrics as well as lower computational and memory requirements.

Here, the main idea behind the present disclosure is presented in an example of an OOD detector.

Figure 1:
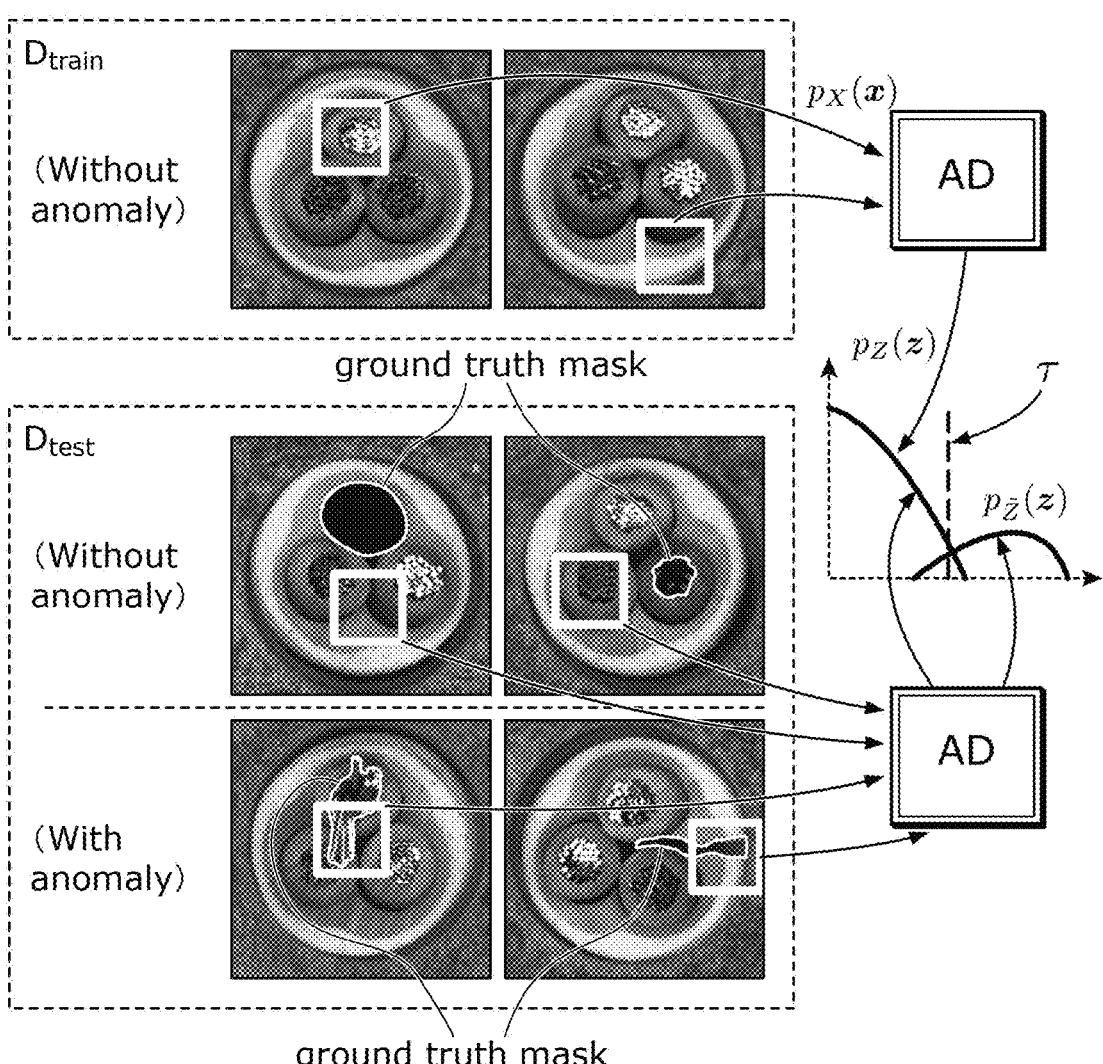
FIG. 1 is a diagram for describing a general anomaly detection method.

FIG. 1 illustrates an example of AD for anomaly localization, more specifically, OOD detection trained on an image dataset $D_{train}$ for training.

Each of $D_{train}$ and $D_{test}$ shown in FIG. 1 includes images each of which shows a cross-section of a cable sliced. $D_{train}$ is a dataset including anomaly-free images. $D_{test}$ is a dataset including anomaly-free images and anomalous images. In Dt es t, each of the anomalous images shows a ground truth mask indicating the location of an anomaly included in the anomalous image.

The OOD detector learns a distribution of features in the anomaly-free images with the probability density function in Math. 1 below and transforms the distribution of features into a Gaussian distribution with the probability density function in Math. 2 below.

$$p_X(x) \qquad \text{(Math. 1)}$$

$$p_Z(z) \qquad \text{(Math. 2)}$$

Threshold value T is a threshold value calculated as a Euclidean distance from the distribution mean. By using threshold value T, a distribution detected by the OOD detector is separated into the probability density function in Math. 3 below representing the distribution of features in the anomaly-free images and the probability density function in Math. 4 below representing a distribution of features in the anomalous images.

$$p_Z(z) \qquad \text{(Math. 3)}$$

$$p_{\tilde{Z}}(Z) \qquad \text{(Math. 4)}$$

The state where the thus obtained probability density function in Math. 5 below is not zero is equivalent to the state where an anomaly is detected. Thus, anomaly detection using threshold value T is performed.

$$p_{\tilde{Z}}(Z) \qquad \text{(Math. 5)}$$

The present disclosure provides an anomaly detection method for performing anomaly detection with high accuracy in a short period of time.

An anomaly detection method according to an aspect of the present disclosure is an anomaly detection method by which a computer performs anomaly detection, and the method includes: obtaining first feature data outputted through N (N is an integer not less than 1) convolutional layers of a convolutional neural network configured as an encoder when an image is inputted to the convolutional neural network; obtaining second feature data outputted through M (M is an integer not less than 1, and M≠N) convolutional layers of the convolutional neural network and different in size from the first feature data; and performing anomaly detection on the image by using features indicated by the first feature data and the second feature data that are different in size.

According to the aspect, in the anomaly detection method, anomaly detection on an image is performed with high accuracy in a short period of time by using first feature data and second feature data that are different in size. Among the first feature data and the second feature data, the feature data having a bigger size is used to output information related to anomaly per smaller area in the image (i.e., information related to anomaly detection with relatively high accuracy), and the time required for a process pertaining to the output of the information is relatively long. Moreover, among the first feature data and the second feature data, the feature data having a smaller size is used to output information related to anomaly per larger area in the image, and the time required for a process pertaining to the output of the information is relatively short. Accordingly, in the above-described anomaly detection method, the time required for a process pertaining to output of information related to anomaly can be shortened compared to when two feature data items both having the bigger size are used to output such information. Shortening the time required for a process pertaining to output of such information contributes to performing anomaly detection in real-time. Moreover, since at least feature data having the bigger size is used, information that takes account of information related to anomaly detection with relatively high accuracy can be outputted. Thus, the anomaly detection method enables anomaly detection to be performed with high accuracy in a short period of time.

For example, the performing of the anomaly detection may include: obtaining first output data outputted from a first decoder including a neural network, by inputting the first feature data to the first decoder; obtaining second output data outputted from a second decoder including a neural network, by inputting the second feature data to the second decoder; and generating and outputting an output image indicating a location in which an anomaly in the image is shown, by aggregating the first output data and the second output data.

According to the aspect, since an output image indicating a location in which an anomaly is shown in the same size as an image inputted (also referred to as input image) is outputted in the anomaly detection method, it may be possible to find out in which location in the input image the anomaly is shown by a comparison between the input image and the output image. Thus, with the anomaly detection method, anomaly detection can be performed with high accuracy in a short period of time, and an anomaly detected may be easily grasped.

For example, the first decoder and the second decoder may be trained to output first output data and second output data that satisfy a predetermined condition, respectively, in response to input of first feature data and second feature data obtained with respect to a normal image in which no anomaly is shown, and the predetermined condition may be that an output image indicating no anomaly is generated by aggregating the first output data and the second output data.

According to the aspect, in the anomaly detection method, since the first decoder and the second decoder are trained to output an output image indicating no anomaly when a normal image is inputted as an input image, an appropriate output image can be easily outputted in response to input of a normal image. Accordingly, the anomaly detection method enables anomaly detection to be performed more easily with high accuracy in a short period of time.

An anomaly detection device according to an aspect of the present disclosure is an anomaly detection device in which a computer performs anomaly detection, and the device includes: a processor; and memory connected to the processor. Using the memory, the processor: obtains first feature data outputted through N (N is an integer not less than 1) convolutional layers of a convolutional neural network configured as an encoder when an image is inputted to the convolutional neural network; obtains second feature data outputted through M (M is an integer not less than 1, and M≠N) convolutional layers of the convolutional neural network and different in size from the first feature data; and performs anomaly detection on the image by using features indicated by the first feature data and the second feature data that are different in size.

According to the aspect, the anomaly detection device exhibits an effect similar to that in the anomaly detection method.

A recording medium according to an aspect of the present disclosure is a non-transitory computer-readable recording medium having recorded thereon a program for causing a computer to execute the above-described anomaly detection method.

According to the aspect, the above-described program exhibits an effect similar to that in the anomaly detection method.

These general and specific aspects may be implemented by using a system, device, integrated circuit, computer program, or computer-readable recording medium such as a CD-ROM, or any combination of systems, devices, integrated circuits, computer programs, or recording media.

Hereinafter, an embodiment will be specifically described with reference to the Drawings.

It should be noted that the embodiment described below shows a general or specific example. The numerical values, shapes, materials, constituent elements, the arrangement and connection of the constituent elements, steps, the processing order of the steps, etc. shown in the following exemplary embodiment are mere examples, and therefore do not limit the scope of the present disclosure. Moreover, among the constituent elements in the following exemplary embodiment, constituent elements not recited in any one of the independent claims defining the broadest concept of the present disclosure are described as arbitrary constituent elements.

Embodiment

In the present embodiment, an anomaly detection method and the like for performing anomaly detection with high accuracy in a short period of time are described.

FIG. 2 is a block diagram schematically illustrating the functional configuration of anomaly detection device 10 according to the embodiment. Anomaly detection device 10 is implemented by a computer, that is, may be implemented by a processor (such as a Central Processing Unit (CPU)) using memory to execute a predetermined program.

When an image is inputted to encoder 20, anomaly detection device 10 performs anomaly detection on the image inputted. Specifically, anomaly detection on the image inputted is performed by a process of detecting the location of an anomaly in the image inputted using inference with an inference model. An image inputted to encoder 20 is also referred to as an input image. The configuration of encoder 20 is described with reference to FIG. 3.

Figure 3:
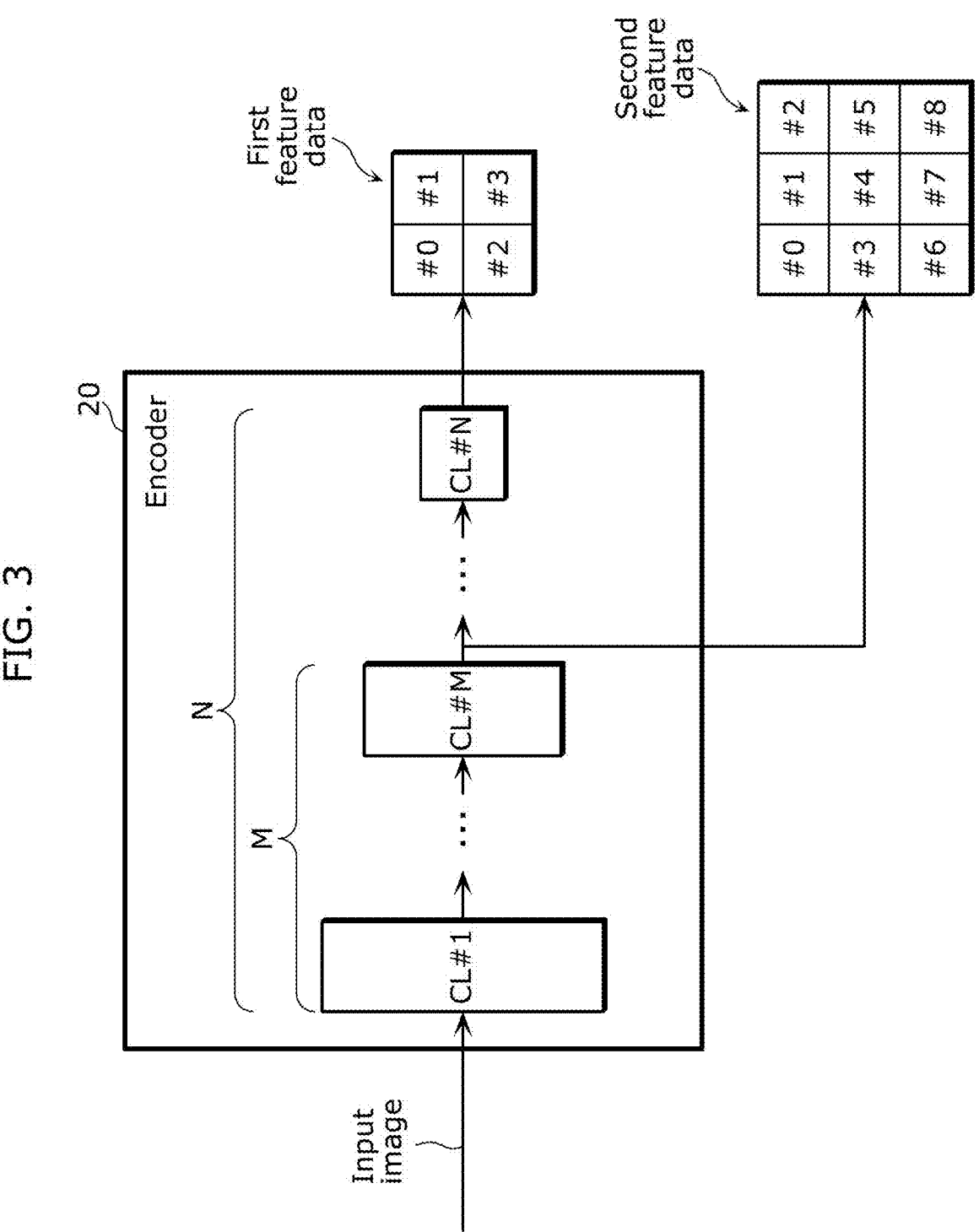
FIG. 3 is a diagram for describing the configuration of an encoder according to the embodiment.

FIG. 3 is a diagram for describing the configuration of encoder according to the embodiment.

As illustrated in FIG. 3, encoder 20 includes convolutional layers (CLs). Here, the number of the CLs included in encoder 20 is N. N is an integer not less than 1.

Among the CLs, the first CL (CL #1) obtains an input image, performs convolution on the input image, and provides the next CL (CL #2) with features that are the result of the convolution. Each of the convolutional layers subsequent to CL #2 obtains features provided from the previous CL, performs convolution on the features obtained, and provides the next CL with the result of the convolution.

Encoder 20 outputs first feature data and second feature data. The first feature data and the second feature data are different in size.

The first feature data is outputted by CL #N. In other words, the first feature data is data outputted through N (N is an integer not less than 1) convolutional layers of a convolutional neural network included in encoder 20. For example, the first feature data is data including features each of which corresponds to a different one of four blocks (blocks #0 to #3) arranged in two columns and two rows. For example, each of the features included in the first feature data includes a value indicating whether an anomaly is present in a location, in the input image, corresponding to the feature; however, the features are not limited to this example.

The second feature data is outputted by CL #M. In other words, the second feature data is data outputted through M (M is an integer not less than 1, and M≠N) convolutional layers of the convolutional neural network included in encoder 20. For example, the second feature data is data including features each of which corresponds to a different one of nine blocks (blocks #0 to #8) arranged in three columns and three rows. For example, each of the features included in the second feature data includes a value indicating whether an anomaly is present in a location, in the input image, corresponding to the feature; however, the features are not limited to this example.

The first feature data can be said to be data indicating an anomaly included in a relatively large area per relatively large area in the input image. On the other hand, the second feature data can be said to be data indicating an anomaly included in a relatively small area per relatively small area in the input image.

As illustrated in FIG. 2, anomaly detection device 10 includes first feature obtainer 11, second feature obtainer 12, first output obtainer 13, second output obtainer 14, and aggregator 15.

When an image is inputted to encoder 20, first feature obtainer 11 obtains first feature data outputted by encoder 20.

When the image is inputted to encoder 20, second feature obtainer 12 obtains second feature data outputted by encoder 20. The second feature data is different in size from the first feature data.

First output obtainer 13 makes an input to first decoder 21 by providing first decoder 21 with the first feature data obtained by first feature obtainer 11. Moreover, first output obtainer 13 obtains first output data outputted from first decoder 21 by inputting the first feature data to first decoder 21. The first output data is image data pertaining to an image that is the same size as the input image and indicates the location of an area including an anomaly indicated by the first feature data. When the first feature data is inputted to first decoder 21, first decoder 21 calculates, by using the first feature data inputted, image data of an image that is the same size as the input image and indicates the location of an area including an anomaly, and outputs the image data as the first output data.

Second output obtainer 14 makes an input to second decoder 22 by providing second decoder 22 with the second feature data obtained by second feature obtainer 12. Moreover, second output obtainer 14 obtains second output data outputted from second decoder 22 by inputting the second feature data to second decoder 22. The second output data is image data pertaining to an image that is the same size as the input image and indicates the location of an area including an anomaly indicated by the second feature data. When the second feature data is inputted to second decoder 22, second decoder 22 calculates, by using the second feature data inputted, image data of an image that is the same size as the input image and indicates the location of an area including an anomaly, and outputs the image data as the second output data.

Aggregator 15 performs anomaly detection on the input image by using the first output data obtained by first output obtainer 13 and the second output data obtained by second output obtainer 14.

More specifically, aggregator 15 aggregates the first output data obtained by first output obtainer 13 and the second output data obtained by second output obtainer 14, to thereby generate and output an output image indicating a location in which an anomaly in the input image is shown. The aggregation is a process to obtain output data having characteristics of a plurality of output data items by calculating a representative value (e.g., sum, average value, or maximum value) of the plurality of output data items, and may be performed by well-known techniques.

Here, first decoder 21 and second decoder 22 may each include a neural network model constructed by machine learning using an input image in which no anomaly is shown (also referred to as normal image). In other words, first decoder 21 may include a neural network model trained to output first output data that satisfies a predetermined condition, in response to input of first feature data obtained with respect to a normal image. Moreover, second decoder 22 may include a neural network model trained to output second output data that satisfies the predetermined condition, in response to input of second feature data obtained with respect to the normal image. The predetermined condition is that an output image indicating no anomaly is generated by aggregating the first output data and the second output data by aggregator 15.

Hereinafter, processes performed by anomaly detection device 10 configured as above will be described.

FIG. 4 is a first flowchart illustrating processes performed by anomaly detection device 10 according to the embodiment.

As illustrated in FIG. 4, in step S11, an image is inputted to encoder 20. It should be noted that the input of the image to encoder 20 may be performed by anomaly detection device 10 or another device.

In step S12, first feature obtainer 11 obtains first feature data outputted through N convolutional layers included in encoder 20. The first feature data is data outputted by encoder 20 in response to the input of the image to encoder 20 in step S11.

In step S13, second feature obtainer 12 obtains second feature data outputted through M convolutional layers included in encoder 20. The second feature data is data outputted by encoder in response to the input of the image to encoder 20 in step S11.

In step S14, anomaly detection device 10 performs anomaly detection on the input image by using features indicated by the first feature data and the second feature data that are different in size.

FIG. 5 is a second flowchart illustrating processes performed by anomaly detection device 10 according to the embodiment. The flowchart illustrated in FIG. 5 indicates detailed processes included in step S14 in FIG. 4.

In step S14a, first output obtainer 13 obtains first output data outputted from first decoder 21 by inputting the first feature data to first decoder 21 including a neural network.

In step S14b, second output obtainer 14 obtains second output data outputted from second decoder 22 by inputting the second feature data to second decoder 22 including a neural network.

In step S14c, aggregator 15 aggregates the first output data obtained in step S14a and second output data obtained in step S14b, to thereby generate and output an output image indicating a location in which an anomaly in the input image is shown.

Anomaly detection device 10 can perform anomaly detection with high accuracy in a short period of time, by processes illustrated in FIG. 4 and FIG. 5.

Hereinafter, the results of processes performed by anomaly detection device 10 will be described with specific examples.

Figure 6:
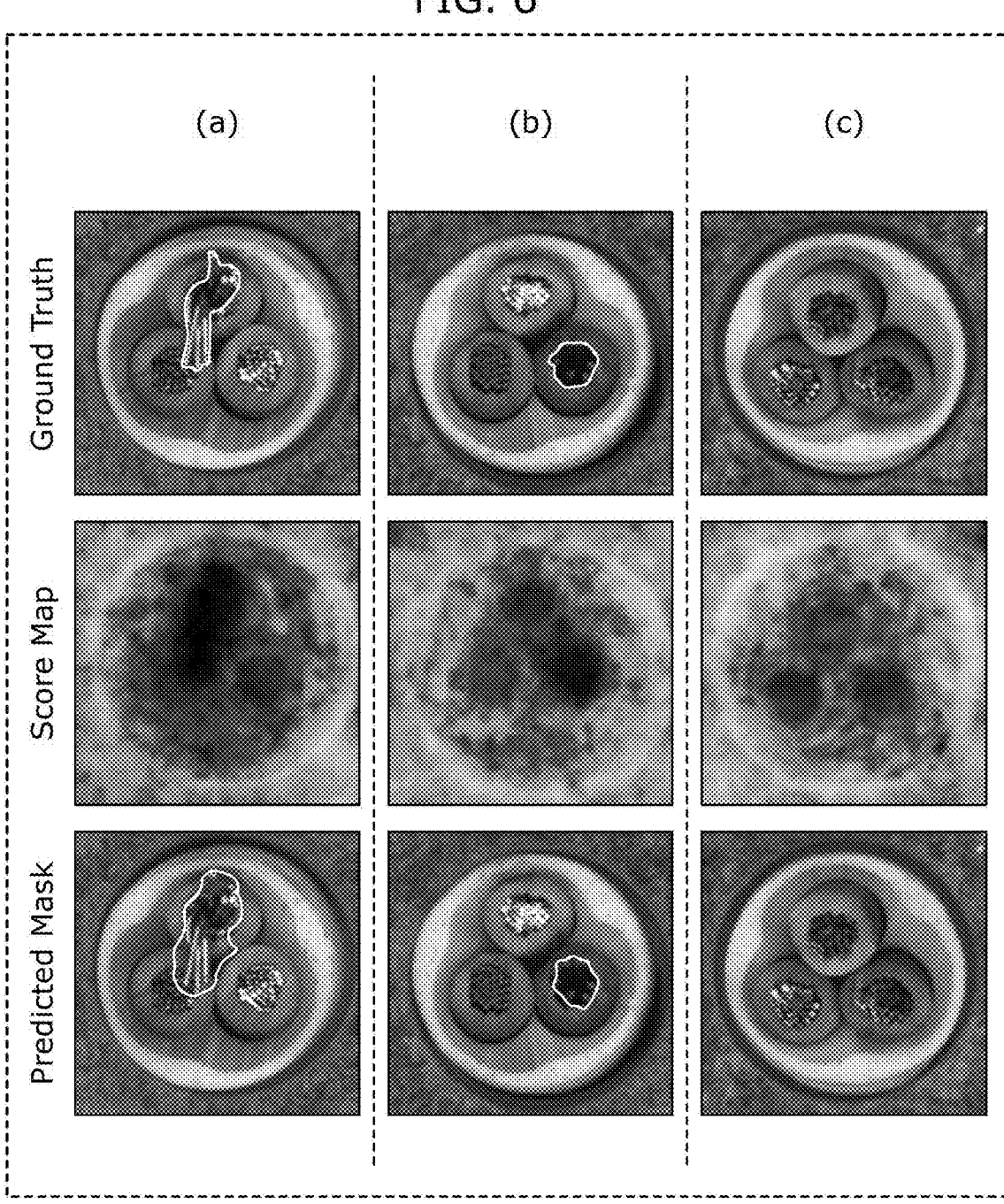
FIG. 6 is a first diagram for illustrating a result of processes performed by the anomaly detection device according to the embodiment.

FIG. 6 is a first diagram for illustrating a result of processes performed by anomaly detection device 10 according to the embodiment.

Three images in each of which a cross-section of a cable including three conductive wires in its inside is shown have been used as input images for (a), (b), and (c) in FIG. 6. Each of (a), (b), and (c) shows a ground truth mask image (indicated as "Grand Truth" in FIG. 6), a score map image (indicated as "Score Map" in FIG. 6), and a detected mask image (indicated as "Predicted Mask" in FIG. 6). It should be noted that the images shown in FIG. 6 are the result of anomaly detection using the MVTec dataset (see NPL 1) as the detection target.

The ground truth mask image is an image obtained by adding, to the input image, a mark indicating the location in which an anomaly is shown. In the ground truth mask image, the mark indicating the location in which an anomaly is shown is illustrated as a white outline enclosing the pixels showing the anomaly.

The score map image is an image showing a degree of anomaly (also referred to as score) detected per pixel in the input image by anomaly detection device 10. In the score map image, a pixel having a color closer to black represents a higher degree of anomaly, that is, a pixel having a color closer to white represents a lower degree of anomaly. The score map image is an example of an output image.

The detected mask image is an image indicating the location of an anomaly in the input image detected by anomaly detection device 10. The location of an anomaly detected by anomaly detection device 10 is, for example, indicated by a white outline enclosing pixels each of which has a score higher than a threshold value. The detected mask image is an example of an output image. A higher degree of coincidence between the detected mask image and the ground truth mask image means that anomaly detection performed by anomaly detection device 10 is more accurate.

Hereinafter, an upward direction on the page on which FIG. 6 is illustrated is referred to as "page-upward direction". The same applies to a downward direction, left direction, and right direction. Moreover, a direction perpendicular to and extending forward from the page on which FIG. 6 is illustrated is referred to as "page-forward direction".

The input image for (a) in FIG. 6 is an image in which three conductive wires are shown. In the input image for (a) in FIG. 6, among the three conductive wires, a conductive wire located on the page-upward direction side is protruding in the page-forward direction and part of the conductive wire is bent toward the page-downward direction. In the ground truth mask image of (a) in FIG. 6, it is shown that the pixels showing the conductive wire located on the page-upward direction side are anomalous.

In the score map image of (a) in FIG. 6, the pixels at the position of the conductive wire located on the page-upward direction side are shown in a color relatively close to black, and it is shown that the scores of the pixels are relatively high.

In the detected mask image of (a) in FIG. 6, it is shown that the pixels showing the conductive wire located on the page-upward direction side including the bent part and the pixels therearound are detected as an anomaly.

The input image for (b) in FIG. 6 is an image in which three conductive wires are shown. In the input image for (b) in FIG. 6, among the three conductive wires, a conductive wire located on the page-lower-right direction side has been discolored to black. In the ground truth mask image of (b) in FIG. 6, it is shown that the pixels showing the conductive wire located on the page-lower-right direction side are anomalous.

In the score map image of (b) in FIG. 6, the pixels at the position of the conductive wire located on the page-lower-right direction side are shown in a color relatively close to black, and it is shown that the scores of the pixels are relatively high.

In the detected mask image of (b) in FIG. 6, it is shown that the pixels showing the conductive wire located on the page-lower-right direction side are detected as an anomaly.

The input image for (c) in FIG. 6 is an image in which three conductive wires are shown. In the input image for (c) in FIG. 6, an anomaly is not included in the cross section of the three conductive wires. In the ground truth mask image of (c) in FIG. 6, a white outline for indicating an anomaly is not shown.

In the score map image of (c) in FIG. 6, it is shown that the overall score of anomaly in the image is relatively low.

In the detected mask image of (c) in FIG. 6, it is shown that there is no anomaly detected.

Figure 7:
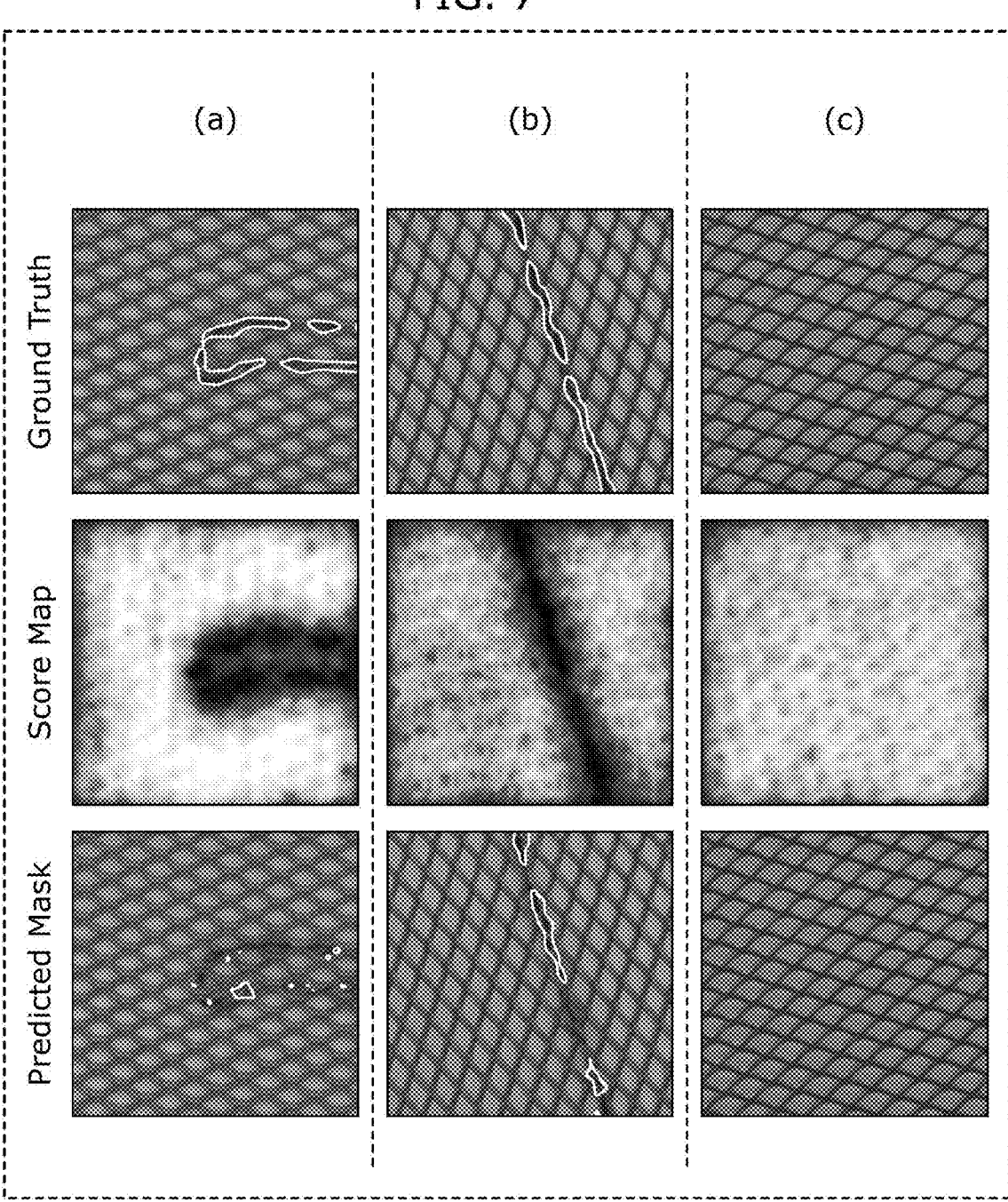
FIG. 7 is a second diagram for illustrating a result of processes performed by the anomaly detection device according to the embodiment.

FIG. 7 is a second diagram for illustrating a result of processes performed by anomaly detection device 10 according to the embodiment.

Three images in each of which a mesh-like wire is shown have been used as input images for (a), (b), and (c) in FIG. 7. Each of (a), (b), and (c) shows a ground truth mask image, a score map image, and a detected mask image, as with FIG. 6. It should be noted that the images shown in FIG. 7 are the result of anomaly detection using the MVTec dataset (see NPL 1) as the detection target.

The input image for (a) in FIG. 7 is an image in which a mesh-like wire including a foreign matter is shown, and the foreign matter is located on part (specifically, an area in the center in the page-up-down direction and extending from the center to the right in the page-left-right direction) of the mesh-like wire. In the ground truth mask image of (a) in FIG. 7, it is shown that the pixels showing the foreign matter are anomalous.

In the score map image of (a) in FIG. 7, the pixels at the position of the foreign matter are shown in a color relatively close to black, and it is shown that the scores of the pixels are relatively high.

In the detected mask image of (a) in FIG. 7, it is shown that part of the pixels showing the foreign matter are detected as an anomaly.

The input image for (b) in FIG. 7 is an image in which a mesh-like wire including a foreign matter is shown, and the foreign matter is located on part (specifically, a linear area extending in the page-up-down direction) of the mesh-like wire. In the ground truth mask image of (b) in FIG. 7, it is shown that the pixels showing the foreign matter are anomalous.

In the score map image of (b) in FIG. 7, the pixels at the position of the foreign matter are shown in a color relatively close to black, and it is shown that the scores of the pixels are relatively high.

In the detected mask image of (b) in FIG. 7, it is shown that part of the pixels showing the foreign matter are detected as an anomaly.

The input image for (c) in FIG. 7 is an image in which a mesh-like wire including no anomaly is shown. In the ground truth mask image of (c) in FIG. 7, a white outline for indicating an anomaly is not shown.

In the score map image of (c) in FIG. 7, it is shown that the overall score of anomaly in the image is relatively low.

In the detected mask image of (c) in FIG. 7, it is shown that there is no anomaly detected.

Figure 8:
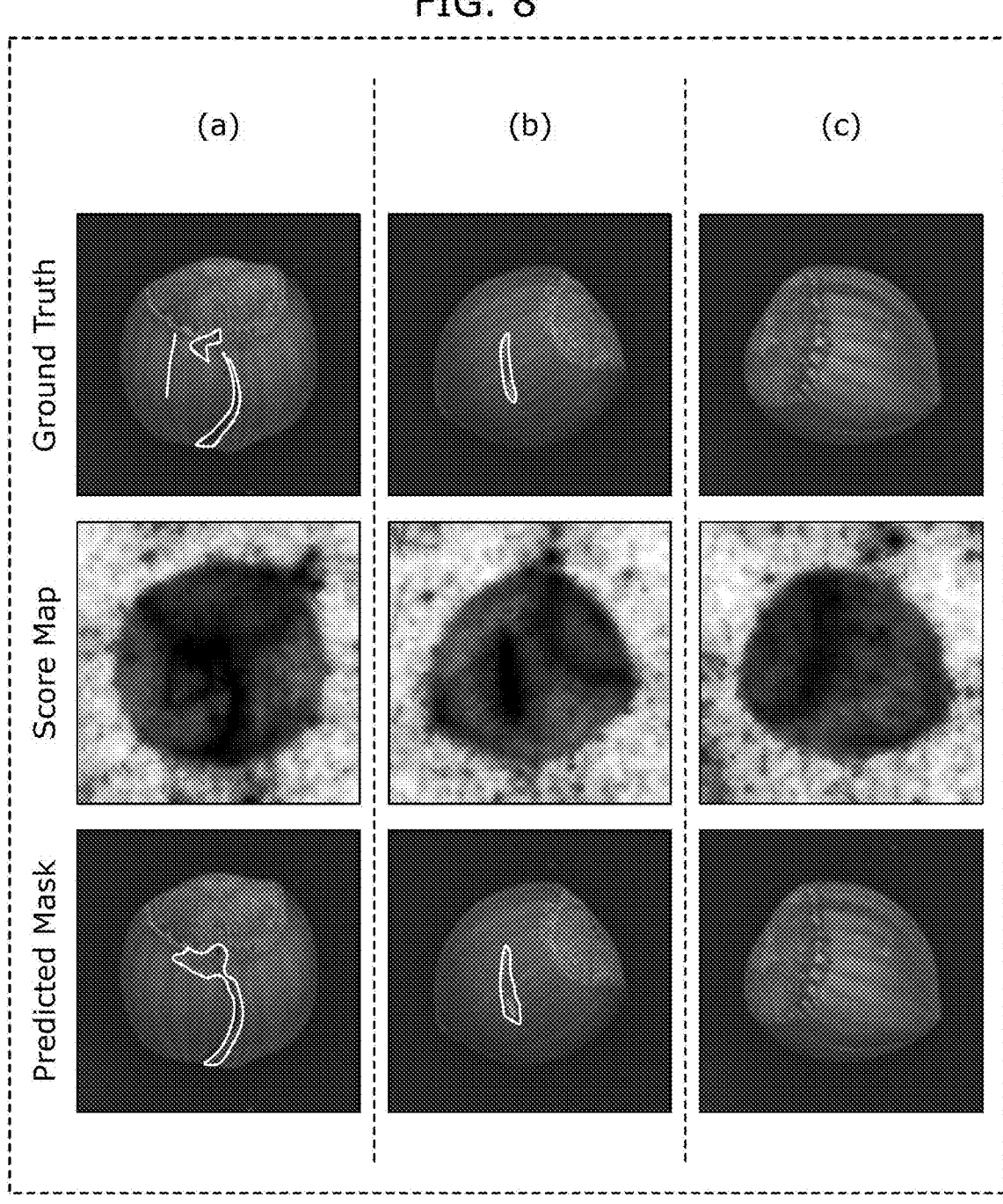
FIG. 8 is a third diagram for illustrating a result of processes performed by the anomaly detection device according to the embodiment.

FIG. 8 is a third diagram for illustrating a result of processes performed by anomaly detection device 10 according to the embodiment.

Three images in each of which an acorn is shown have been used as input images for (a), (b), and (c) in FIG. 8. Each of (a), (b), and (c) shows a ground truth mask image, a score map image, and a detected mask image, as with FIG. 6. It should be noted that the images shown in FIG. 8 are the result of anomaly detection using the MVTec dataset (see NPL 1) as the detection target.

The input image for (a) in FIG. 8 is an image in which an acorn having three cracks is shown, and the three cracks are located on part (specifically, an area extending from the center of the cupule to the remains of style) of the acorn. In the ground truth mask image of (a) in FIG. 8, it is shown that the pixels showing the cracks are anomalous.

In the score map image of (a) in FIG. 8, the pixels at the positions of the cracks are shown in a color relatively close to black, and it is shown that the scores of the pixels are relatively high.

In the detected mask image of (a) in FIG. 8, it is shown that an area including two of the three cracks is detected as an anomaly.

The input image for (b) in FIG. 8 is an image in which an acorn having a crack is shown, and the crack is located on part (specifically, an area between the center of the cupule and the remains of style) of the acorn. In the ground truth mask image of (b) in FIG. 8, it is shown that the pixels showing the crack are anomalous.

In the score map image of (b) in FIG. 8, the pixels at the position of the crack are shown in a color relatively close to black, and it is shown that the scores of the pixels are relatively high.

In the detected mask image of (b) in FIG. 8, it is shown that an area including the crack is detected as an anomaly.

The input image for (c) in FIG. 8 is an image in which an acorn having no crack is shown. In the ground truth mask image of (c) in FIG. 8, a white outline for indicating an anomaly is not shown.

In the score map image of (c) in FIG. 8, it is shown that the overall score of anomaly in the image is relatively low.

In the detected mask image of (c) in FIG. 8, it is shown that there is no anomaly detected.

FIG. 9 is a first diagram for illustrating performance values of anomaly detection device 10 according to the embodiment.

In FIG. 9, a detection rate (Detection) and localization rates (Localization) by anomaly detection device 10 are shown together with detection rates and localization rates in Comparative Examples.

The detection rate indicates the percentage of correctly detected anomalies, more specifically, the percentage of the number of anomalies detected by anomaly detection device 10 for an image with respect to the number of anomalies included in the image. The detection rate in the case where AUROC has been used as an evaluation metric is shown.

The localization rate indicates the percentage of correctly localized anomalies, more specifically, the percentage of the number of anomalies localized by anomaly detection device 10 for an image with respect to the number of anomalies included in the image. The localization rate in the case where AUROC has been used as an evaluation metric and the localization rate in the case where AUPRO has been used as an evaluation metric are shown.

Comparative Example 1-1 shows the result by SVDD (NPL 2), Comparative Example 1-2 shows the result by SPADE (NPL 3), Comparative Example 1-3 shows the result by CutPaste (NPL 4), and Comparative Example 1-4 shows the result by PaDiM (NPL 5).

The detection rate by anomaly detection device 10 is 98.26% and is the highest compared to those in Comparative Examples 1-1 to 1-4. Moreover, the localization rate by anomaly detection device 10 is 98.62% when AUROC has been used and 94.60% when AUPRO has been used, and these localization rates are each the highest compared to those in Comparative Examples 1-1 to 1-4.

FIG. 10 is a second diagram for illustrating performance values of anomaly detection device 10 according to the embodiment.

In FIG. 10, a detection rate (Detection) and a localization rate (Localization) by anomaly detection device 10 are shown together with detection rates and localization rates in Comparative Examples. The detection rate and localization rate in the case where AUROC has been used as an evaluation metric are shown. It should be noted that the performance values shown in FIG. 10 are the result of anomaly detection using the STC (NPL 6) dataset as the detection target.

Comparative Example 2-1 shows the result by CAVGA (NPL 7), Comparative Example 2-2 shows the result by SPADE (NPL 3), and Comparative Example 2-3 shows the result by PaDiM (NPL 5).

The detection rate by anomaly detection device 10 is 72.63% and is high compared to that in Comparative Example 2-2. Moreover, the localization rate by anomaly detection device 10 is 94.48% and is the highest compared to those in Comparative Examples 2-1 to 2-3.

FIG. 11 is a third diagram for illustrating performance values of anomaly detection device 10 according to the embodiment.

In FIG. 11, speed of inference (Inference speed) and data size of an inference model (Model size) for detection by anomaly detection device 10 are shown together with those in Comparative Example.

The speed of inference is represented as the number of images on which a detection process has been performed by anomaly detection device 10 per unit time. The unit time is, for example, one second. The speed of inference when the size of an input image is 256×256 pixels and the speed of inference when the size of an input image is 512×512 pixels are shown on the left side and the right side of a forward slash (/), respectively.

Moreover, the data size of an inference model when the STC dataset is used and the data size of an inference model when the MVTec dataset is used are shown on the left side and the right side of a forward slash (/), respectively.

Comparative Example 3-1 shows the result by PaDiM (NPL 5).

The speed of inference by anomaly detection device 10 is 34 frame per second (fps) when the size of an input image is 256×256 pixels and the speed of inference by anomaly detection device 10 is 12 fps when the size of an input image is 512×512 pixels, and these speeds of inference are each high compared to those in Comparative Example 3-1.

Moreover, the data size of the inference model of anomaly detection device 10 is 96 MB both when using the STC dataset and when using the MVTec dataset, and is small compared to those in Comparative Example 3-1.

FIG. 12 is a fourth diagram for illustrating performance values of anomaly detection device 10 according to the embodiment. The architecture of the encoder that was used when the performance values shown in FIG. 12 were obtained is different from the architecture of the encoder that was used when the performance values shown in FIG. 11 were obtained. The description format of the performance values shown in FIG. 12 is the same as that in FIG. 11.

Comparative Example 4-1 shows the result by SPADE (NPL 3), and Comparative Example 4-2 shows the result by PaDiM (NPL 5).

The speed of inference by anomaly detection device 10 is 27 fps when the size of an input image is 256×256 pixels and the speed of inference by anomaly detection device 10 is 9 fps when the size of an input image is 512×512 pixels, and these speeds of inference are each high compared to those in Comparative Examples 4-1 and 4-2.

Moreover, the data size of the inference model of anomaly detection device 10 is 947 MB both when using the STC dataset and when using the MVTec dataset, and is small compared to those in Comparative Examples 4-1 and 4-2.

As described above, with an anomaly detection method according to the above-described embodiment, anomaly detection on an image is performed with high accuracy in a short period of time by using first feature data and second feature data that are different in size. Among the first feature data and the second feature data, the feature data having a bigger size is used to output information related to anomaly per smaller area in the image (i.e., information related to anomaly detection with relatively high accuracy), and the time required for a process pertaining to the output of the information is relatively long. Moreover, among the first feature data and the second feature data, the feature data having a smaller size is used to output information related to anomaly per larger area in the image, and the time required for a process pertaining to the output of the information is relatively short. Accordingly, in the above-described anomaly detection method, the time required for a process pertaining to output of information related to anomaly can be shortened compared to when two feature data items both having the bigger size are used to output such information. Shortening the time required for a process pertaining to output of such information contributes to performing anomaly detection in real-time. Moreover, since at least feature data having the bigger size is used, information that takes account of information related to anomaly detection with relatively high accuracy can be outputted. Thus, the anomaly detection method enables anomaly detection to be performed with high accuracy in a short period of time.

Moreover, since an output image indicating a location in which an anomaly is shown in the same size as an image inputted (also referred to as input image) is outputted in the anomaly detection method, it may be possible to find out in which location in the input image the anomaly is shown by a comparison between the input image and the output image. Thus, with the anomaly detection method, anomaly detection can be performed with high accuracy in a short period of time, and an anomaly detected may be easily grasped.

Moreover, in the anomaly detection method, since a first decoder and a second decoder are trained to output an output image indicating no anomaly when a normal image is inputted as an input image, an appropriate output image can be easily outputted in response to input of a normal image. Accordingly, the anomaly detection method enables anomaly detection to be performed more easily with high accuracy in a short period of time.

It should be noted that each of constituent elements in the embodiment may be configured as dedicated hardware or may be realized by executing a software program suitable for each of the constituent elements. Each of the constituent elements may be realized by a program executing unit such as a CPU or processor loading and executing a software program stored in a recording medium such as a hard disk or semiconductor memory. Here, a software that realizes an anomaly detection device according to the embodiment is a program as described below.

Namely, the program is an program that causes a computer to execute an anomaly detection method by which the computer performs anomaly detection, and the method includes: obtaining first feature data outputted through N (N is an integer not less than 1) convolutional layers of a convolutional neural network configured as an encoder when an image is inputted to the convolutional neural network; obtaining second feature data outputted through M (M is an integer not less than 1, and M≠N) convolutional layers of the convolutional neural network and different in size from the first feature data; and performing anomaly detection on the image by using features indicated by the first feature data and the second feature data that are different in size.

Although an anomaly detection method and the like according to one or more aspects have been described based on the embodiment as above, the present disclosure is not limited to this embodiment. Various modifications of the embodiment as well as embodiments resulting from arbitrary combinations of constituent elements of the embodiment that may be conceived by those skilled in the art are intended to be included within the scope of the one or more aspects as long as these do not depart from the essence of the present disclosure.

INDUSTRIAL APPLICABILITY

The present disclosure is applicable to an anomaly detection device that detects an anomaly in an image.

The invention claimed is:

1. An anomaly detection method by which a computer performs anomaly detection, the method comprising:

obtaining first feature data outputted through N convolutional layers of a convolutional neural network configured as an encoder when an image is inputted to the convolutional neural network, N being an integer not less than 1;

obtaining second feature data outputted through M convolutional layers of the convolutional neural network and different in size from the first feature data, M being an integer not less than 1 and not equal to N; and performing anomaly detection on the image by using features indicated by the first feature data and the second feature data that are different in size, wherein at least part of the M convolutional layers is shared with at least part of the N convolutional layers.

2. The anomaly detection method according to claim 1, wherein the performing of the anomaly detection includes:

obtaining first output data outputted from a first decoder including a neural network, by inputting the first feature data to the first decoder;

obtaining second output data outputted from a second decoder including a neural network, by inputting the second feature data to the second decoder; and generating and outputting an output image indicating a location in which an anomaly in the image is shown, by aggregating the first output data and the second output data.

3. The anomaly detection method according to claim 2, wherein the first decoder and the second decoder are trained to output first output data and second output data that satisfy a predetermined condition, respectively, in response to input of first feature data and second feature data obtained with respect to a normal image in which no anomaly is shown, and the predetermined condition is that an output image indicating no anomaly is generated by aggregating the first output data and the second output data.

4. A non-transitory computer-readable recording medium having recorded thereon a program for causing a computer to execute the anomaly detection method according to claim 1.

5. An anomaly detection device in which a computer performs anomaly detection, the device comprising:

a processor; and memory connected to the processor, wherein using the memory, the processor:

obtains first feature data outputted through N convolutional layers of a convolutional neural network configured as an encoder when an image is inputted to the convolutional neural network, N being an integer not less than 1;

obtains second feature data outputted through M convolutional layers of the convolutional neural network and different in size from the first feature data, M being an integer not less than 1 and not equal to N; and performs anomaly detection on the image by using features indicated by the first feature data and the second feature data that are different in size, wherein at least part of the M convolutional layers is shared with at least part of the N convolutional layers.

\*  \*  \*  \*  \*